United States Patent [19]

Moore

[11] Patent Number: 4,540,586

[45] Date of Patent: Sep. 10, 1985

[54] METHOD OF PRESERVING FODDERS WITH A NUTRITIVE COATING

[76] Inventor: William P. Moore, P.O. Box 943, Hopewell, Va. 23860

[21] Appl. No.: 509,915

[22] Filed: Jul. 1, 1983

[51] Int. Cl.³ ................................................ A23L 3/00
[52] U.S. Cl. ..................................... 426/69; 426/302; 426/310; 426/419
[58] Field of Search ................. 426/310, 419, 418, 69, 426/302

[56] References Cited

U.S. PATENT DOCUMENTS

| | | | |
|---|---|---|---|
| 2,768,896 | 10/1956 | Lewis | 426/310 X |
| 3,295,984 | 1/1967 | Hansen | 99/2 |
| 3,485,635 | 12/1969 | Fassauer | 426/310 X |
| 3,873,733 | 3/1975 | Moore | 426/69 |
| 3,934,041 | 1/1976 | Snyder | 426/69 |
| 3,989,846 | 11/1976 | Helgerson | 426/2 |
| 4,120,980 | 10/1978 | Merget et al. | 426/69 |

FOREIGN PATENT DOCUMENTS

| | | | |
|---|---|---|---|
| 0086067 | 8/1983 | European Pat. Off. | 426/69 |
| 43675 | 4/1977 | Japan | 426/69 |
| 2038159 | 7/1980 | United Kingdom | 426/69 |
| 0882513 | 11/1981 | U.S.S.R. | 426/69 |

OTHER PUBLICATIONS

J. T. Huber and O. T. Santana, *Ammonia Treated Corn Silage,* Journal of Dairy Science 55:489.

Slip-Ons, Advertisement by the Ohio Farmers Grain and Supply Association, Fostoria, Ohio 44830.

*Primary Examiner*—Joseph Golian

[57] ABSTRACT

A method of preserving fodder masses for animal feeding by applying an acid catalyzed coating liquid to the surfaces of the fodder masses. The coating liquid comprises a thermosetting monomer and a nutritive cross-linking agent, which is catalytically polymerized and cross-linked by a mineral acid to form a water insoluble solid barrier to the penetration of moisture, air, and other elements which can cause degradation of stored fodder. Suitable thermosetting monomers include: urea-formaldehyde resins, furfuryl alcohol, and their mixtures. Liquid carbohydrates derived from vegetable sources, particularly molasses, starch, and fermentation by-products, are effective cross-linking agents. Mineral acids found to be effective for the polymerization and cross-linking include: phosphoric, sulfuric, and hydrochloric acids.

2 Claims, No Drawings

METHOD OF PRESERVING FODDERS WITH A NUTRITIVE COATING

BACKGROUND OF THE INVENTION

1. Field of the Invention

This invention relates to fodders and their preservation as feeds for domestic animals and more particularly to a new method for preserving fodders by coating them with a thin liquid coating which polymerizes, by means of an acid catalyst, on the surface of the fodder to form a solid, water insoluble, nutritive barrier to penetration by moisture, air, dusts, and other elements which can cause degradation of fodder.

2. Description of the Prior Art

The term fodder, as used herein, is defined as any coarse vegetablederived material used for feeding animals. Fodders may be fed to ruminant animals, such as cattle or sheep, and some fodders may be effectively fed to monogastric animals, such as horses, swine and poultry. Some of the fodders which are particularly useful for feeding animals include: hays, such as alfalfa, Timothy, and Orchardgrass; silages, such as whole corn plant, corn stover, and sorghum; vegetable wastes, such as soybean plants, and bean shells; and by-products from ethyl alcohol production by fermentation, such as Brewer's and Distiller's Grains.

Because fodders are harvested, or produced, at different rates than they are consumed, it is almost always necessary to store them for considerable periods of time before their use as animal feeds. Storage periods of six months and longer are usual, and storage times longer than twelve months sometimes occur. Fodders may be stored in bulk forms in open areas, such as hay stacks; in bulk in covered areas, such as silage pits; in bulk in confined areas, such as cylindrical, vertical silos; or in confined masses in open or covered areas, such as bales in open or covered areas. During storage portions of the feed value of fodders are lost by degradation. The degree of degradation depends to a large extent on the amount of penetration of the fodder by harmful elements. The term elements used herein means chemical and biological materials present in the atmosphere around the stored fodders, and includes moisture, air, dust, spores of fungi, biologically active chemicals, and other incidental materials. Elements causing degradation of the feed values of fodders may be natural or man made. Two of the most destructive elements are water and air. Degradation from the sun's rays can occur in fodders stored in uncovered areas. It is not unusual to lose about one-third of the feeding value of hay stored in uncovered areas for a season even if there is no significant fungal attack. Where fungal attack or putrefaction is significant, as is frequently the case, losses can be even higher.

Little art exists on the preservation of fodders by covering masses of the fodder to prevent penetration of harmful elements. Coating of individual particles of ruminant feed supplement chemicals to control their release has been reported by Hansen in U.S. Pat. No. 3,295,984, and Helgerson in U.S. Pat. No. 3,989,846 reported an improved feed and food composition for animals where urea and an aldehyde were reacted alone or in the presence of a catalyst to provide urea as an indirect protein source available for digestion by animals at a controlled rate.

Protection of fodder masses against degradation from fungal and microbial attack by application of ammonia throughout the mass to destroy, or deactivate, contained fungi and microbes was described by J. T. Huber and O. T. Santana in an article entitled Ammonia Treated Corn Silage, published in Journal of Dairy Science 55:489. This treatment represented a substantial step forward in the preservation of fodders, but unfortunately required the treatment of the whole body of the fodder with a substantial amount of biologically active and hazardous chemical. Chemicals, such as ammonia, may be lost by evaporation or leaching, allowing subsequent degradation. Chemical treatments throughout the mass of fodder provides no protection against penetration into the fodder by elements from outside, such as air, water, dust, fungi, bacteria, or hazardous chemicals.

A technique is in use now whereby silage is loaded into relatively shallow pits in the ground and covered with large plastic sheets. More recently sheets of thin plastic, usually polyolefin, have been shaped into slip-on covers for the protection of large round hay bales. These plastic sheet coverings also represent a step forward in the protection of fodders. Unfortunately, they are subject to penetration by moisture, air, and other elements under their edges, and are difficult to maintain in place during winds and rains. Another difficulty is obtaining the plastic sheets in the sizes and shapes necessary to fit the masses of fodders to be covered, since almost every fodder mass is different enough in size and shape to make a snug fit with a plastic sheet difficult. Since the plastic sheets have no feed value and might even cause harm to an animal if ingested by it, they must be removed before the fodder may be used. The plastic sheets, and the labor required to apply and remove them from fodder masses contribute substantially to the cost of fodders without contributing to their feeding value.

Thus, there are no teachings from the prior art which would provide a method for preserving fodders with a coating liquid which solidifies to form a water insoluble, nutritive barrier to penetration by moisture, air, dusts, and other elements which can cause degradation of the fodder.

SUMMARY OF THE INVENTION

It is therefore a primary object of this invention to provide a method of preserving fodder by coating it with a nutritive barrier to penetration by solids and fluids into the fodder.

It is a further object to provide a method of preserving fodder for animal feeding by coating it with a nutritive thermosetting barrier to dusts, moisture, and air.

It is a further object to provide a continuous method of producing a nutritive thermosetting coating on a mass of fodder.

It is a further object to provide a preserved fodder product suitable for feeding to domestic animals.

These objects and others are achieved by the instant invention. In accordance with the method of this invention, a coating liquid is used to cover the surface of a mass of fodder. The coating liquid comprises: a monomer which is catalytically polymerizable by acid; and a nutritive cross-linking agent which is reactable with the monomer, under the influence of an acid catalyst. Acid catalyst is blended with the coating liquid causing polymerization and cross-linking to commence. The coating liquid is applied to the surface of the fodder before it has sufficient time to polyermize and cross-link to the solid state. Sufficient acid strength is added in the coating liquid so that it continues to polymerize a cross-link after it is applied to the fodder so that it solidifies into a thin, solid, water insoluble, nutritive layer, which functions as a barrier on the surface of the fodder.

The barrier preserves the fodder by blocking penetration into the fodder by moisture, air, sunlight, dust, microbes, spores of fungi, and hazardous materials which can cause degradation of the fodder. Monomeric materials which combine with an effective nutritive cross-linking agent, and polymerize to a solid state under the influence of an acid catalyst may be used as the monomer. Urea-formaldehyde resins, furfuryl alcohol, and combinations thereof have been found to be especially effective in polymerizing with acid catalysts and cross-linking with nutritive cross-linking agents. Carbohydrates were found to be effective cross-linking agents which readily formed solid barrier coatings with acid-catalyzed monomers. Molasses and vegetable products, and by-products, were found to be effective carbohydrate cross-linking agents. Strong acids and their acid salts were found to be effective acid catalysts in the method of this invention.

DETAILED DESCRIPTION OF THE INVENTION

The instant invention is directed to a method of preserving fodder by coating it with a thin, nutritive barrier to penetration by solids and fluids. The term nutritive barrier is used to indicate that the material forming the barrier is nutritious and has value as an animal feed and that it restricts the flow of the elements into the fodder.

To obtain the improved fodder preservation provided by this invention, it is necessary to use a coating liquid that comprises: a monomer, which is harmless in animal feeds and which may be catalytically polymerized by acid blended with a sufficient amount of nutritive cross-linking agent, which may be acid catalyzed to react with the monomer, to form an edible fodder coating which is harmless to animals. The coating fluid may be a stored blend of monomer and cross-linking agent. These materials may also be stored separately and blended just before their use. The term monomer is used herein to mean chemical compounds, or partially cured resins, which may be reacted with themselves or other materials to form higher molecular weight compounds, known in the art as polymers. These reactions are usually called polymerization. The term cross-linking agent is used herein to mean compounds, or polymers which react with polymers to connect two or more polymer molecules. The term harmless in animal feeds means that amounts, which might normally be ingested by an animal consuming fodders preserved by the method of this invention, would cause no harm to the animal consuming it.

The method of this invention is initiated by acidifying the coating liquid to a pH lower than 7. When the coating liquid is acidified it begins to polymerize and cross-link toward the eventual formation of a water insoluble solid.

The acidified coating liquid must then be applied to the exposed surface of the fodder before the acid catalyzed polymerization and cross-linking proceeds to the solid state. The time allowed for making the application after acidification may be varied by the degree of acidification used in the coating liquid.

When the acidified coating liquid has been applied to the fodder, polymerization and cross-linking is continued until the coating liquid becomes a water insoluble solid film, which is a barrier to penetration by solids and fluids.

Although the coating fluid used in this invention may be a blend of monomer and cross-linking agent in any ratio which may be reacted by acid catalyst to form a water insoluble, edible coating on fodder, the instant invention is particularly effective when the coating liquid comprises between one and ten parts of cross-linking agent admixed with each part of monomer. All parts used herein are expressed as parts by weight, unless otherwise specified.

Aqueous urea-formaldehyde resin containing between about 1.2 and 2.0 mols of formaldehyde per mol of urea and between 50 and 85 percent total solids, and having a kinematic viscosity at 16° C. between about 30 and 600 centipoise, has been found to be a particularly effective monomer. Resins containing less than 50 percent solids were found to have poor storage stability and those having viscosities above 600 centipoise were difficult to deliver and blend with the cross-linking agent. It was found that the degree of precuring of the resin could be varied considerable without significantly reducing the effectiveness of the monomer. UF resins with F/U ratios appreciably lower than 1.2 were less effective as monomers because they polmerized and cross-linked to water insoluble solids at a slow rate.

Furfuryl alcohol was found to polymerize and cross-link under the influence of acid catalyst to produce a water insoluble solid coating on fodders which was an effective barrier to penetration of the surfaces of fodder. It may be premixed and stored for long periods of time with the cross-linking agents of this invention. A particularly effective barrier having increased flexibility and resiliency is produced when the monomer is a mixture containing between about one and four parts of urea-formaldehyde resin per part of furfuryl alcohol.

Carbohydrates have been found to be effective cross-linking agents for the method of this invention when they contain between about 20 and 70 percent sugars, expressed in terms of dextrose equivalents. Carbohydrates are defined herein as organic chemical compounds of carbon, hydrogen, and oxygen, which contain carbon-carbon skeletal chains of 5 to 12 members, and contain carbonyl and multiple polyhydroxy functional groups. The carbohydrates must be liquid, or dissolved in water and form edible solids to be effective in the method of this invention.

It has been found that those liquid carbohydrates derived from vegetable sources are very effective in this method and are generally available. The chemistry of the cross-linking of the carbohydrates with the polymerizing monomers is not completely understood, but the reaction is believed to be initiated by the formation of hemiacetals on the carbohydrate molecules, which are subsequently dehydrated to alkylene groups, as the polymerization and cross-linking progresses.

Molasses was found to be the preferred liquid carbohydrate source for a cross-linking agent because it reacted rapidly with the monomers of this method to form homogeneous, effective, solid barriers on the surface of fodder masses with relatively small amounts of acid catalysts. Cane molasses was the preferred molasses from the standpoints of economics and utility. Other effective molasses were: starch molasses, beet molasses, distiller molasses, hemicellulose extract wood molasses, and lignin sulfonate molasses.

Other carbohydrates derived from vegetable processing found effective as cross-linking agents were corn syrup, concentrated corn steep liquor, fermented corn extractive, starch, vegetable oils, vegetable oil refinery liquids, and fermentation by-products.

I have found that optimum fodder preservation is obtained when the coating liquid is acidified by admixing acid amounting to between 3 and 25 percent of the coating, which produces a pH in the coating liquid between about 0 and 4. When sufficient acid is added to decrease the pH below zero, polymerization and cross-linking is so rapid that the coating liquid solidifies before it can be delivered to, and coated on, the surface of the fodder mass. When the acid added is insufficient to decrease pH below 4, polymerization and cross-linking is slow enough that a significant amount of the coating liquid is lost by flowing into the fodder before it solidifies, thereby requiring a thicker than necessary coating, and an uneconomical utilization of materials.

Acids found to be particularly effective in the method of this invention and suitable for inclusion in coatings on fodders for feeding to animals are phosphoric, superphosphoric, and hydrochloric acids. It was found that best results were usually obtained where these acids were used in the highest economical concentrations available. The best concentrations were: phosphoric acid, 54 percent as $P_2O_5$; superphosphoric acid, 70 percent $P_2O_5$; and hydrochloric acid, 30 percent hydrogen chloride. Concentrated sulfuric acid caused charring and was not satisfactory, however, excellent results were obtained with 20 percent aqueous sulfuric acid.

Where the fodder surface was fine and soaking of the coating liquid into the fodder was not a problem, it was found that aqueous solutions of acidic salts of mineral acids produced satisfactory barriers to penetration. Acidic salts found effective were ammonium chloride, and ammonium sulfate.

When the coating liquid is acidified it starts to polymerize and cross-link and progresses from a free-flowing liquid to a water insoluble solid. The coating liquid must remain in the liquid state long enough to allow it to be transmitted to the fodder mass and then applied to its surface before it solidifies. It has been found that the coating liquid should be applied to the exposed surface of fodder between about 1 and 360 seconds after acid is admixed with the coating liquid. Coating liquids applied in less than one second were very difficult to get completely mixed with the acid used for acidification before it was necessary to apply the mixture. When more than 360 seconds time elapsed after acidification, it was found that the coating liquid went deeper into the surface of the fodder than desirable before it solidified, thus consuming larger amounts of coating liquid than necessary. The preferred time for applying the coating liquid is between about 15 and 60 seconds after it is acidified.

To preserve fodders by coating them with a nutritive barrier to penetration by solids and liquids it was found preferable to apply the acidified coating liquid to the exposed surfaces of the fodder to a thickness between about 0.1 and 2 centimeters. Coatings less than 0.1 centimeter thick did not provide a sufficient barrier to the penetration of harmful elements which can destroy the preservation of the fodder. Coatings thicker than 2 centimeters, although effective, were frequently insufficiently flexible, more expensive than necessary, and difficult to break up and ingest by animals consuming the fodder.

When the coating liquid is applied to the fodder surface, it is liquid and water soluble. After it is applied, it continues to polymerize and cross-link until it solidifies into a water insoluble barrier, usually passing through a tacky, semi-solid state. It has been found beneficial to add sufficient acid in the acidification step, or after the liquid is applied to the fodder, so that the coating liquid continues to polymerize and cross-link on the fodder surface for a minimum time of ten minutes after it is applied. If the coated fodder is exposed to the elements, such as water, prior to ten minutes, penetration of the elements may occur and the effectiveness of the preservation can be diminished.

Certain fillers may be added to the coating liquid, which increase the viscosity of the liquid even before substantial polymerization and cross-linking has occurred, thereby decreasing the permeation of the coating liquid into the mass of the fodder before it solidifies. The use of these fillers was found to be important where the exposed surfaces of the fodders are very coarse and subject to permeation by large amounts of the coating liquids. Fillers found to be effective in reducing the amount of coating liquid required comprised carboxymethylcellulose, Attapulgite Clay, Bentonite, kelp-based gels, and water soluble polyacrylamide polymer gels.

I have found that a unique, preserved, coated fodder can be effectively produced only by the procedures described in the preceeding paragraphs, and that the product has practical, and economical value in the field of agriculture.

The method of this invention for preserving fodders is especially effective for preserving fodders for animal feeding by coating the fodders with a nutritive thermosetting barrier to dusts, moisture, and air. The term thermosetting is used herein to mean hardening a single time and not becoming soft and moldable each time it is heated. To effectively operate this method, I have found that a stepwise procedure must be followed, which is listed as follows:

(1) Acidify a coating liquid to a pH of between 1 and 3 by admixing a mineral acid. Mineral acids found to be especially effective are phosphoric, hydrochloric, and sulfuric acids. The coating liquid optimally contains between 20 and 40 percent urea-formaldehyde resin and between 60 and 80 percent cane molasses. The most effective resin contains between 1.3 and 1.6 mols of formaldehyde per mol of urea and between 60 and 75 percent total solids and has a kinematic viscosity of between 75 and 300 centipoise at 16° C. The cane molasses was found to function most effectively as a nutritive cross-linking agent when it contained between 48 and 70 percent total sugar content.

(2) Hold the acidified coating liquid for a period between 15 and 60 seconds to allow the acid catalyzed polymerization and cross-linking of the monomer and cross-linking agent to start.

(3) Apply the coating liquid to exposed surfaces of the fodder in a thickness between about 0.3 and 1.2 centimeters before the liquid solidifies. The exposed surfaces of the fodder should be substantially coated, although preservation of the fodder may be achieved even if some of the surface is left uncoated. It is necessary that sufficient surface be coated to prevent substantial penetration of fodder by the elements.

(4) Maintain the pH of the coating on the fodder surface between about 1 and 4 for a minimum time of about 10 minutes, until the coating has polymerized and cross-linked sufficiently to form a water insoluble solid barrier on the fodder surface.

The method of this invention may be carried out as a series of batch steps, but it is preferably carried out as a continuous method of producing a thermosetting coating on a mass of fodder which method comprises operations listed as follows:

(1) A continuous stream of coating liquid, comprising a monomer, which is catalytically polymerizable by acid, and a nutritive cross-linking agent, reactable with the monomer by means of acid catalyst, is delivered from a reservoir to mixing vessel. The coating liquid may be delivered by any suitable means, and is effectively delivered by centrifugal, gear, or diaphragm pumps, and by applied air pressure. The reservoir may be close to the mixing vessel, or it may be quite far from it and be connected by long, flexible delivery lines.

(2) A continuous stream of mineral acid is delivered from an acid reservoir to the mixing vessel. The acid may also be delivered through short or long delivery lines by means of pumps or applied pressure.

(3) The coating liquid and the mineral acid are comingled in the mixing vessel to produce a reaction mixture. This reaction mixture was found to produce a superior preservation barrier when it had a pH of between 0 and 3 and the retention time of the reaction mixture in the mixing vessel was between about 20 and 60 seconds. It was found that the mixing vessel could be a mechanically agitated vessel having a low surface to volume ratio, or a tubular vessel having a high length to diameter ratio and a high surface to volume ratio with no mechanical agitation, where mixing is obtained by the turbulent flow of the liquids.

(4) The mixed acidified coating liquid is applied onto the exposed surfaces of the fodder masses to form a barrier of sufficient thickness to impede penetration of water and air into the fodder.

(5) To make the preserved fodder ready for exposure to the elements, the pH of the acidified coating liquid on the fodder surface is maintained between 1 and 4 until the coating liquid forms a water insoluble solid by means of polymerization and cross-linking to a water insoluble solid barrier which is palatable to and digestible by ruminant animals.

The fodders preserved by the method described in the last paragraph were found to be storable for commercially practical periods of time in the elements with substantially no spoilage, degradation, or loss in feeding values. Further, it was found that the solid barriers in the prescribed thicknesses, were palatable to and digestible by ruminant animals.

The preferred coating liquid for use in the continuous method of producing a thermosetting coating on a mass of fodder was found to comprise one part of partially-cured aqueous urea-formaldehyde resin monomer, containing between 1.3 and 1.6 mols formaldehyde per mol of urea and between 60 and 76 percent total solids, admixed with between 2 and 6 parts of molasses containing between 48 and 70 percent total sugars, as a nutritive cross-linking agent. The term partially-cured is used herein to indicate that the resin has been cooked at a pH between 4 and 6 long enough to convert at least part of the methylol moeities to methylene groups and then neutralized to a pH between 6 and 9 before the resin solidified and before the kinematic viscosity exceeded 600 centipoise.

The continuous method was also successfully operated in a similar manner using a coating liquid comprising one part of furfuryl alcohol monomer and between 2 and 6 parts of molasses containing between 48 and 70 percent total sugars as cross-linking agents.

MODE OF OPERATION OF THE INVENTION

Having described the basic concepts of the instant invention, reference is now made to the following examples which are provided to illustrate the best method for carrying out the invention.

EXAMPLE 1

In a 400 ml beaker equipped with a magnetic stirrer and an electrode to measure pH, 128.6 ml of cane molasses cross-linking agent, containing 61 percent total sugar content, was mixed with 42.8 ml of partially cured urea formaldehyde resin monomer at an ambient temperature of 22° C. and atmospheric pressure to form a coating liquid. The formaldehyde to urea mol ratio of the ureaform resin was 1.38, its kinematic viscosity was 250 centipoise at 16° C., and its total solids content was 63 percent. It had been cooked for about 45 minutes at 90° C. at pH 4.2, then neutralized to pH 8.0, and cooled to ambient termperature of about 20° C.

Several aluminum pans 250 mm in diameter were evenly filled to a depth of about 50 mm with fodder, consisting of chopped, freshly cut alfalfa.

To the vigorously stirred beaker was added 57.2 ml of laboratory grade phosphoric acid containing 62 percent phosphate as $P_2O_5$, to acidify the coating liquid. The pH of the coating liquid decreased to 1.3, and polymerization and cross-linking between the resin and molasses commenced while stirring was continued. After 20 seconds stirring, the acidified coating liquid was applied as evenly as possible to the surface of the fodder, by pouring. The coating liquid continued to polymerize and cross-link on the surface of the fodder forming a solid 60 seconds after its application as a liquid had commenced.

The coated fodder in the aluminum pan was allowed to continue to polymerize and cross-link for an additional ten minutes and then water was sprayed onto the surface of the fodder in the pan. The coating was found to be water insoluble and it prevented the penetration of the water into the fodder.

EXAMPLE 2

A sample of the product from Example 1 was broken up and placed along with other alfalfa hay in the feed bunker of four producing Holstein dairy cows. They readily accepted and consumed the product from Example 1 along with the other alfalfa hay.

EXAMPLE 3

The product from Example 1 was broken up into pieces to pass through a Tyler 12 mesh screen. A sample of this material was placed in an artificial rumen containing natural rumen juices freshly withdrawn from a fistualted Holstein steer. The nitrogen content of the urea-formaldehyde resin monomer was found to break down and release nutritious ammonia in the rumen fluid slightly faster than natural soybean meal protein, and the sugars from the molasses cross-linking agent were readily digested in the rumen fluid and formed carboxylic acids, and other products of digestion.

EXAMPLE 4

In the apparatus of Example 1, when 95.8 ml of the monomer and 95.8 ml of the cross-linking agent were mixed with 28.2 mls of 30 percent aqueous hydrochloric acid, it was necessary to quickly pour the mixture from the beaker because it formed a barrier on the fodder in 4 seconds after it was acidified. The barrier was water insoluble and resistant to penetration by water into the fodder.

EXAMPLE 5

In the apparatus of Example 1, when 128.6 ml of the cane molasses cross-linking agent of Example 1 was blended with 42.8 ml of commercial grade furfuryl alcohol to form the coating liquid and 28.6 grams of 20 percent aqueous sulfuric acid were admixed, polymerization and cross-linking occurred so that a hard barrier of water insoluble solid which was resistant to penetration by water and the elements was formed 35 seconds after the acidification was accomplished.

EXAMPLE 6

Coating liquid was loaded into a 50-gallon stainless steel supply reservoir. It was prepared by combining 25 percent ureaformaldehyde resin monomer, containing 1.38 mols of formaldehyde per mol of urea and 63 percent total solids, having a viscosity of 250 centipoise at 16° C., with 75 percent molasses cross-linking agent containing 80 percent cane molasses, and 20 percent distiller's molasses, and containing 60 percent total sugars, expressed as dextrose equivalent.

Wet process, green, superphosphoric acid containing 68 percent $P_2O_5$ was loaded into a 30-gallon stainless steel acid catalyst supply reservoir.

The coating liquid and acid catalyst supply reservoirs were connected by flexible hoses to calibrated individual Oberdorfer gear pumps equipped with variable speed drive motors. The pumps were each connected by separate flexible hoses to a blending tee, and protected by check valves mounted just upstream from the blending tee. The blending tee was a simple device containing three nozzles and no moving parts, which brought in two separate streams and discharged one mixed stream.

The blending tee was connected to a single flexible hose having an internal diameter of ¾ inch and a length of 40 feet which served as a mixing vessel and as a delivery tube.

The coating liquid supply pump was actuated and it continuously delivered coating liquid to the mixing tee at the rate of one gallon per minute. An instant later the acid catalyst pump was actuated and it continuously delivered superphosphoric acid to the mixing tee at the rate of 0.2 gallons per minute. The two liquids comingled at the mixing tee and as they jointly progressed down the flexible hose serving as the mixing chamber and delivery hose. They polymerized and cross-linked as the combined liquid flowed down the hose.

The coating liquid was discharged from the end of the delivery hose at a pH measured to be 1.1, in a 10 percent aqueous mixture. From the 0.9 gallon volume of the delivery tube, the average retention time in the mixing vessel-delivery tube prior to delivery to the surface of the fodder was calculated to be 45 seconds. The coating liquid was observed to continue to polymerize and cross-link on the surface of the fodder until it solidified about 35 seconds after it was applied to the exposed fodder surface, with little permeation of the liquid into the fodder.

The fodder covered in this example was freshly chopped whole corn plant silage and it was piled into a shallow pile having a diameter of about 12 feet and a height in the center of about 3 feet.

Continuously applying the acidified coating liquid, the pile of silage was covered as evenly as possible in 7 minutes. The surface of the pile was found to be constituted roughly of 1 part of the fodder and 1 part of the coating liquid, now solidified into a barrier having a high degree of physical integrity and water insolubility.

The amount of coating liquid used was 7.0 gallons and the amount of superphosphoric acid used was 1.4 gallons. The average permeation of the barrier into the hay was about 1 centimeter (0.4 inches), although the film varied somewhat because the application was done manually.

The applicator was turned off by first deactivating the acid supply pump and allowing the coating fluid to flush the mixing vessel and application tube. The system was then flushed with water.

Ten minutes after the coating was completed, water was sprayed onto the fodder and was repelled without any of the water penetrating the fodder.

EXAMPLE 7

The product from Example 6 was stored uncovered in an open field for 6 months. No degradation, mold, spoilage, or odors were found which would suggest any type of failure in the preservation of the feeding value of the corn silage. This silage was then fed to four Holstein milk cows. It was instantly palatable to the cows which consumed the protective barrier as well as the hay.

I claim:

1. A method of preserving fodder for animal feeding by coating it with a nutritive thermosetting barrier to dusts, moisture, and air, which method comprises:
    (a) acidifying a coating liquid to a pH of between 1 and 3 by admixing a mineral acid selected from the group consisting of phosphoric, hydrochloric, and sulfuric acids, the coating fluid comprising between 20 and 40 percent ureaformaldehyde resin monomer, containing between 1.3 and 1.6 mols of formaldehyde per mol of urea and between 60 and 75 percent total solids, and having a viscosity of between 75 and 300 centipoise at 16° C., and between 60 and 80 percent nutritive cross-linking agent comprising cane molasses containing between 48 and 70 percent total sugars;
    (b) holding the acidified coating liquid for a period of between 15 and 60 seconds to allow acid catalyzed polymerization and cross-linking of the monomer and cross-linking agent to start;
    (c) applying the coating liquid to exposed surfaces of the fodder in a thickness between about 0.3 and 1.2 centimeters before it solidifies, covering enough of the exposed surface to substantially prevent the penetration of the fodder by the elements;
    (d) maintaining pH of the coating liquid on the fodder surface between about 1 and 4 for a minimum time of about 10 minutes until the coating liquid has polymerized and cross-linked sufficiently to form a water insoluble solid barrier on the fodder surface.

2. A continuous method of producing a nutritive thermosetting coating on a mass of fodder which comprises:
    (a) delivering a continuous stream of the mineral acid of claim 1, from an acid reservoir to a mixing vessel;

(b) delivering a continuous stream of the coating liquid of claim 1, from a reservoir to the mixing vessel;

(c) comingling, in the mixing vessel, coating liquid and mineral acid in amounts required to produce a reaction mixture having a pH between 0 and 3, for a retention time in the mixing vessel of between 20 and 60 seconds;

(d) applying the acidified coating liquid on exposed surfaces of fodder masses to form a barrier of sufficient thickness to impede penetration of water and air into the fodder;

(e) maintaining pH of the acidified liquid coating on the fodder surface between 1 and 4 until the coating liquid forms, by means of polymerization and cross-linking, a water insoluble solid barrier.

* * * * *